US012001827B2

(12) United States Patent
Stevens et al.

(10) Patent No.: US 12,001,827 B2
(45) Date of Patent: Jun. 4, 2024

(54) SYSTEM AND METHOD FOR SYSTEM-WIDE FIRMWARE DOWNGRADE CONTROL

(71) Applicant: DELL PRODUCTS, LP, Round Rock, TX (US)

(72) Inventors: Robert T. Stevens, Austin, TX (US); Mukund P. Khatri, Austin, TX (US); Lee E. Ballard, Georgetown, TX (US)

(73) Assignee: Dell Products L.P, Round Rock, TX (US)

( * ) Notice: Subject to any disclaimer, the term of this patent is extended or adjusted under 35 U.S.C. 154(b) by 700 days.

(21) Appl. No.: 16/939,809

(22) Filed: Jul. 27, 2020

(65) Prior Publication Data
US 2022/0027138 A1    Jan. 27, 2022

(51) Int. Cl.
*G06F 8/65* (2018.01)
*G06F 8/71* (2018.01)
*G06F 21/57* (2013.01)

(52) U.S. Cl.
CPC ................. *G06F 8/65* (2013.01); *G06F 8/71* (2013.01); *G06F 21/572* (2013.01); *G06F 2221/033* (2013.01)

(58) Field of Classification Search
CPC .......... G06F 21/57; G06F 21/572; G06F 8/71; G06F 8/65; G06F 11/1433
See application file for complete search history.

(56) References Cited

U.S. PATENT DOCUMENTS

| | | | |
|---|---|---|---|
| 8,874,922 B2 | 10/2014 | Jaber et al. | |
| 9,507,581 B2 | 11/2016 | Butcher et al. | |
| 10,764,108 B2* | 9/2020 | Thomas | H04L 41/0213 |
| 2010/0100966 A1* | 4/2010 | Hamid | G06F 21/575 |
| | | | 726/26 |
| 2011/0296404 A1 | 12/2011 | Zhang et al. | |
| 2013/0185564 A1* | 7/2013 | Jaber | G06F 21/57 |
| | | | 713/176 |
| 2014/0223160 A1* | 8/2014 | Kim | G06F 11/0793 |
| | | | 717/170 |
| 2016/0217283 A1* | 7/2016 | Liu | G06F 21/572 |
| 2017/0357500 A1* | 12/2017 | Vidyadhara | G06F 9/4411 |
| 2018/0063225 A1* | 3/2018 | Thomas | H04L 41/0213 |

(Continued)

FOREIGN PATENT DOCUMENTS

CN     110149370 A  *  8/2019  ........... H04L 41/082

*Primary Examiner* — Tae K Kim
(74) *Attorney, Agent, or Firm* — Larson Newman, LLP (57) ABSTRACT

An information handling system includes a basic input/output system configured to update an attribute of a system-wide firmware downgrade security policy prior to booting to an operating system of the information handling system. The attribute of the system-wide firmware downgrade security policy is used to determine whether to allow or to disallow downgrade of a firmware to a version. A processor may perform the downgrade of the firmware, wherein the downgrade of the firmware includes the processor further configured to check the attribute of the system-wide firmware downgrade security policy and to store a firmware image in a scratchpad. If the attribute of the system-wide firmware downgrade security policy allows the downgrade of the firmware to the version, then the processor may continue with the downgrade of the firmware otherwise discard the firmware image in the scratchpad.

20 Claims, 7 Drawing Sheets

(56) References Cited

U.S. PATENT DOCUMENTS

| | | | |
|---|---|---|---|
| 2018/0136928 A1* | 5/2018 | Downum | G06F 8/654 |
| 2019/0042228 A1* | 2/2019 | Nolan | G06F 8/64 |
| 2019/0087582 A1* | 3/2019 | Villatel | G06F 21/575 |
| 2019/0227876 A1* | 7/2019 | Dardis | G06F 8/71 |
| 2019/0377564 A1* | 12/2019 | Poenaru | G06F 3/0673 |
| 2020/0019397 A1* | 1/2020 | Duran | H04L 9/3247 |
| 2020/0034541 A1* | 1/2020 | Ballard | G06F 8/654 |
| 2020/0097657 A1* | 3/2020 | Jacquin | G06F 11/1433 |
| 2020/0293298 A1* | 9/2020 | Harris | G06F 13/4282 |
| 2020/0344265 A1* | 10/2020 | Kelly | G06F 21/57 |
| 2020/0372157 A1* | 11/2020 | Singer | G06F 11/0793 |
| 2021/0117176 A1* | 4/2021 | Watt | G06F 8/65 |
| 2021/0216305 A1* | 7/2021 | Rathore | G06F 8/656 |
| 2021/0279049 A1* | 9/2021 | Nolan | G06F 8/64 |

\* cited by examiner

SYSTEM AND METHOD FOR SYSTEM-WIDE FIRMWARE DOWNGRADE CONTROL

FIELD OF THE DISCLOSURE

The present disclosure generally relates to information handling systems, and more particularly relates to system-wide firmware downgrade control.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a basic input/output system configured to update an attribute of a system-wide firmware downgrade security policy prior to booting to an operating system of the information handling system. The attribute of the system-wide firmware downgrade security policy is used to determine whether to allow or to disallow downgrade of a firmware to a version. A processor may perform the downgrade of the firmware, wherein the downgrade of the firmware includes the processor further configured to check the attribute of the system-wide firmware downgrade security policy and to store a firmware image in a scratchpad. If the attribute of the system-wide firmware downgrade security policy allows the downgrade of the firmware to the version, then the processor may continue with the downgrade of the firmware otherwise discard the firmware image in the scratchpad.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
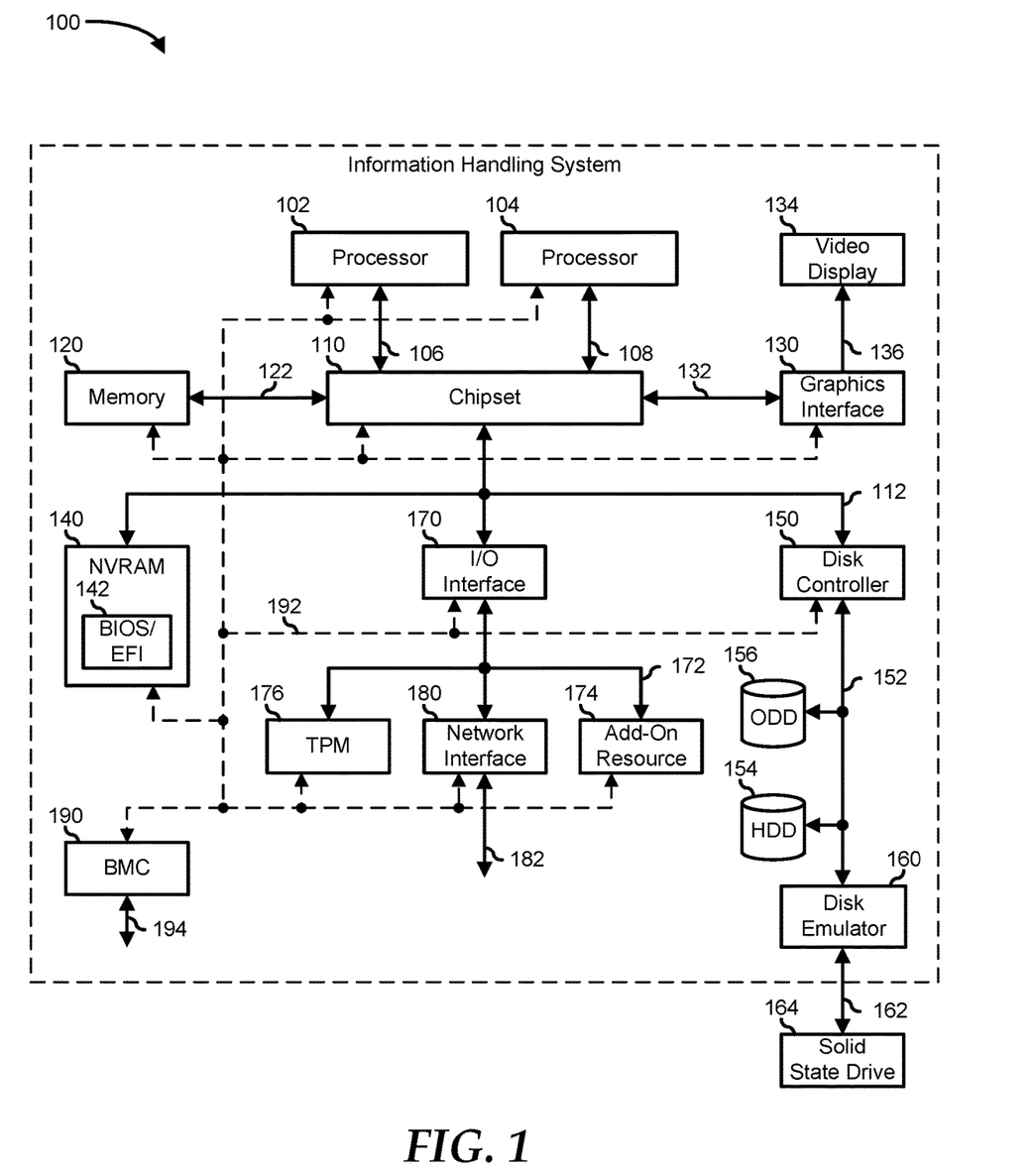
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM), Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after the power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Firmware updates are released to resolve issues or improve the functionality or address a security vulnerability of an information handling system component. Generally, a firmware enforcement policy is maintained to manage firmware versions across one or more information handling systems. The firmware enforcement policy may prevent a user from downgrading to an older firmware version. However, in some instances the administrator may have operational requirements such as wherein certain older firmware versions are desirable or when the administrator may be managing an information handling system with an older operating system that does not support a newer firmware version. Also, the administrator may have a validated a known good configuration that they are locked on, wherein the administrator has mitigated the security vulnerability in another way. Preventing the administrator to perform the downgrade to the older firmware version may force him to install an undesired firmware version with no capability of using his desired firmware version. Thus, a system and method that would allow the administrator to load a desired firmware version is desirable allowing him control of the firmware versions of the information handling components under his management.

Figure 2:
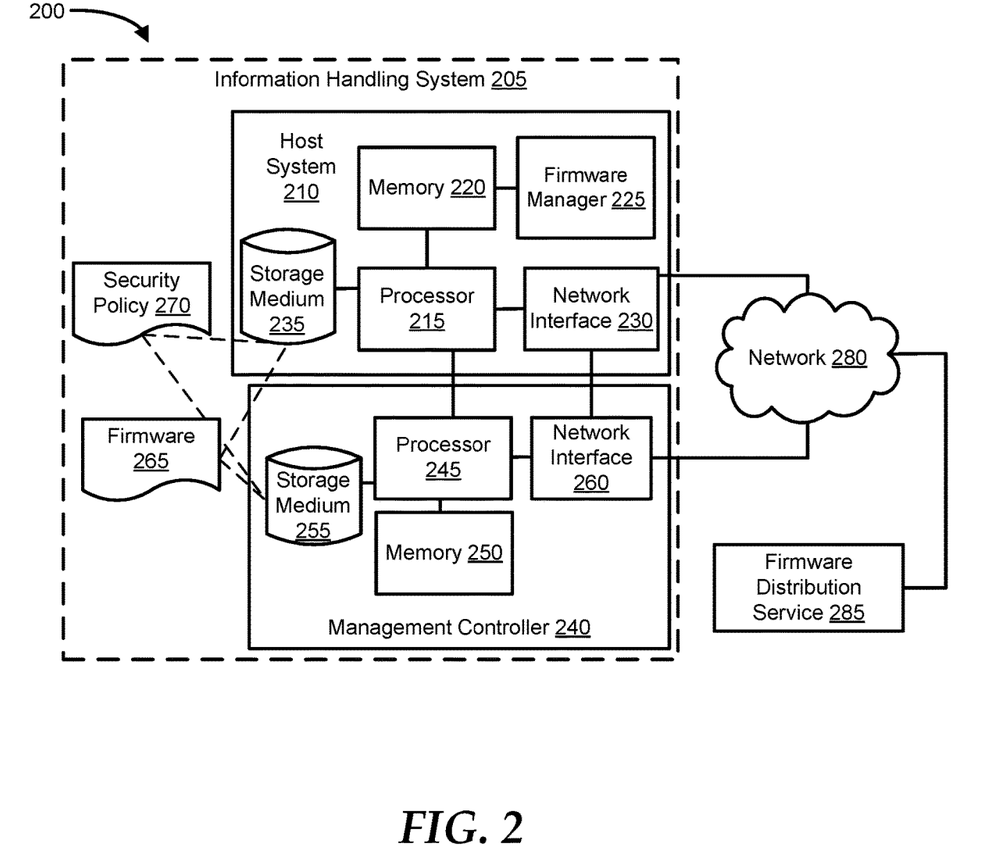
FIG. 2 is a block diagram illustrating an example of an environment for system-wide firmware downgrade control.

FIG. 2 illustrates an environment 200 for system-wide firmware management including firmware upgrade and/or downgrade. Environment 200 includes an information handling system 205, a network 280, and a firmware distribution service 285. Information handling system 205, which is similar to information handling system 100 of FIG. 1, includes a management controller 240 and a host system 210. Management controller 240 may include a processor 245, a network interface 260, a memory 250, and a storage medium 255. Host system 210 may include a memory 220, a firmware manager 225, a processor 215, a network interface 230, and a storage medium 235. Storage medium 235 and/or storage medium 255 may be used to store a security policy 270 and a firmware 265.

Information handling system 205 may include one or more components also referred to as devices such as hard disk drives (HDDs), compact disc ROM (CD-ROM) drives, and digital video disk (DVD) drives, and/or various other devices and the like that include controllers or adapters. Each one of the devices may include a firmware such as firmware 265. Firmware 265 may control and/or monitor a device of information handling system 205. From time to time, it may be desirable to upgrade or to downgrade firmware 265. Upgrading may refer to replacing the firmware with a newer version. Downgrading may refer to replace the firmware with an older version. For example, a firmware upgrade may be used to correct errors in, and/or improve the performance of the device. Subsequently, a firmware downgrade may be desirable if the firmware upgrade caused vulnerabilities or issues. In general, limiting the user from downgrading to a firmware version with vulnerabilities or issues is a good security policy. However, there may be instances wherein in an override may be desirable to allow the user to downgrade the firmware to the version with known the vulnerabilities or issues.

The firmware upgrade and/or downgrade may be performed by firmware manager 225, and/or the other tools. Firmware manager 225 and/or the other tools may work from within an operating system, BIOS, or within a management controller such as management controller 240. The firmware upgrade and/or downgrade may be implemented in various ways depending on a given system software environment and may use a firmware image that may be contained in a firmware package, such as a self-contained file, for distribution and deployment. The process of upgrading and/or downgrading the firmware is sometimes referred to as "flashing" of the device, as the firmware manager usually replaces the firmware image stored in a flash memory associated with the device with another firmware image. The firmware package may be received from firmware distribution service 285 through network 280 via network interface 260 and/or network interface 230. Network interface 230 and network interface 260 may enable information handling system 205 to communicate over network 280 using any suitable transmission protocol and/or standard including without limitation all transmission protocol and/or standards.

Firmware distribution service 285 may be configured to deliver firmware packages to supported information handling systems such as information handling system 205. Firmware distribution service 285 may be maintained by a third party or the manufacturer of information handling system 205 and/or its associated devices.

Firmware manager 225 may utilize a system-wide firmware downgrade security policy, hereinafter referred to as a security policy, such as security policy 270 during the firmware upgrade and/or firmware downgrade process. Security policy 270 may include a set of rules that are used for protecting and/or managing upgrade and/or downgrade of the firmware of one or more devices of information handling system 205. In particular, security policy 270 may be used to determine whether to upgrade or downgrade firmware 265. In addition, security policy 270 may determine the versions to which the firmware can be upgraded to or downgraded from.

Processor 215 may be similar to processor 245, may include any system, device, or apparatus configured to interpret and/or execute program instructions and/or process data. Processor 215 and processor 245 and may include, without limitation a microprocessor, a microcontroller, a digital signal processor (DSP), an application-specific integrated circuit (ASIC), or any other digital or analog circuitry configured to interpret and/or execute program instructions and/or process data stored in memory 220, storage medium 235 or other components of information handling system 205. Memory 220 may be similar to memory 120 of FIG. 1. Storage medium 235 may be similar to ODD 156, HDD 154, or SSD 164 of FIG. 1.

Network interface 230 may include any suitable system, apparatus, or device operable to serve as an interface between host system 210 and network 280. Network interface 230 may enable host system 210 to communicate over network 280 using any suitable transmission protocol and/or standard, including without limitation transmission protocols and/or standards enumerated below with respect to the discussion of network 280.

Security policy 270 may allow the user such as an administrator the ability to override security protections and permit the installation of down-level firmware on information handling system 205 that otherwise would not be allowed which may be based on a security level. While the user performing the firmware update generally has root or administrator operating system privilege, the enforcement of customer FW policy may utilize an additional authentication/authorization privilege. The additional authentication privilege may be based on an out-of-band management controller in a separate security domain. The additional authentication privilege may also be based on a physical or an out-of-band access to the BIOS and BIOS credentials. Security policy 270 may also reflect an additional limit on the ability of the user to downgrade the firmware to a certain version. The version may refer to a security version, a firmware version, or a release version. The security policy may include a list of blacklisted and/or whitelisted versions of the firmware. In one example, a BIOS firmware may have a version number, such as A06. The security policy may allow the downgrade to a version A04 but not version A05. Thus, the system security downgrade policy may allow the user an additional level of control.

Management controller 240, which may be similar to BMC 190 of FIG. 1, maybe a system, device, apparatus, or component of information handling system 205 configured to monitor and/or manage information handling system 205 regardless of whether information handling system 205 is powered on and/or has an operating system installed thereon. In certain embodiments, management controller 240 may include or may be a BMC, a management engine, an access controller, a service processor. Management controller 240 maybe or maybe a part of a Dell Remote Access Controller (DRAC), or an iDRAC which is systems management hardware and software solutions operable to provide remote management capabilities.

In certain embodiments, management controller 240 may allow for out-of-band control of information handling system 205, such that communications to and from management controller 240 are communicated via a management channel physically isolated from the "in-band" communication with network interface 230. Thus, for example, if a failure occurs in information handling system 205 that prevents an administrator from remotely accessing information handling system 205 via network interface 230 such as operating system failure and power failure, the administrator may still be able to monitor and/or manage information handling system 205 via management controller 240. In an embodiment, the administrator may upgrade the firmware of one or more devices or components of information handling system 205.

Management controller 240 may include a management communication channel to host system 210 and/or the devices of information handling system 205. Management controller 240 may use the management communication channel to enforce security policy 270 which may be stored in storage medium 235 and/or storage medium 255.

Processor 245 may be configured to interpret and/or execute program instructions and/or process data stored in memory 250, storage medium 255, or other components of management controller 240 and/or information handling system 205. Storage medium 235 may be similar to ODD 156, HDD 154, or SSD 164 of FIG. 1.

Memory 220 and/or memory 250 may be similar to memory 120 of FIG. 1 may include any system, device, or apparatus configured to retain program instructions and/or data for a period of time such as a computer-readable media. Memory 220 and/or memory 250 may include a RAM, an EEPROM, a PCM-CIA card, a flash memory, a magnetic storage, an opto-magnetic storage, or any suitable selection and/or array of volatile or non-volatile memory that retains data after power to information handling system 205 is turned off or power to management controller 240 is removed.

Network interface 260 may include any suitable system, apparatus, or device operable to serve as an interface between management controller 240 and network 280. Network interface 260 may enable management controller 240 to communicate over network 280 using any suitable transmission protocol and/or standard, including without limitation transmission protocols and/or standards enumerated below with respect to the discussion of network 280.

Network 280 may be implemented as or maybe a part of, a storage area network (SAN), a personal area network (PAN), a local area network (LAN), a metropolitan area network (MAN), a wide area network (WAN), a wireless local area network (WLAN), a virtual private network (VPN), an intranet, the Internet, or any other appropriate architecture or system that facilitates the communication of signals, data and/or messages. Network 280 may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS), or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 280 and its various components may be implemented using hardware, software, or any combination thereof.

Firmware 265 may be a firmware such as Dell's Embedded System Management firmware, remote access controller (RAC) firmware, and PowerEdge Expandable RAID Controller (PERC) firmware, a BIOS program and/or device drivers such as a network interface card (NIC) drivers. A BIOS program may include software that facilitates interaction with and between information handling system 205 devices such as a keyboard, a mouse, and/or one or more I/O devices. Firmware 265 may be store in memory 220, processor 215, storage medium 235, and/or management controller 240.

Firmware 265 may be a firmware image and may include meta-data information such as a version number, a security version number, a hash, a signature, a public key, and release information. The version and/or other metadata of firmware 265 may be used to upgrade and/or downgrade firmware 265. The firmware image may be included in a firmware package, also referred to as an update package, which may be downloaded via firmware manager 225. Firmware manager 225 may also be configured to extract the firmware image and transfer it to an image repository such as a storage medium or a memory after the download. Firmware 265 may be temporarily stored in storage medium 255 or storage medium 235 while an authentication/verification process is undertaken. In certain embodiments, the upgrade and/or downgrade may be automatic while in other embodiments, user intervention may be desirable. For example, a user may initiate the upgrade or the downgrade.

Prior to performing the upgrade or the downgrade, firmware 265 may perform an inventorying step for the device which it supports and then notify the user and/or firmware manager 225 regarding information associated with the device and/or firmware such as the firmware version and firmware version that is installed. In addition, the firmware package may also inform the user regarding the firmware version in the update package. The user and/or firmware manager 225 can then opt whether to continue with the upgrade and/or the downgrade.

Figure 3:
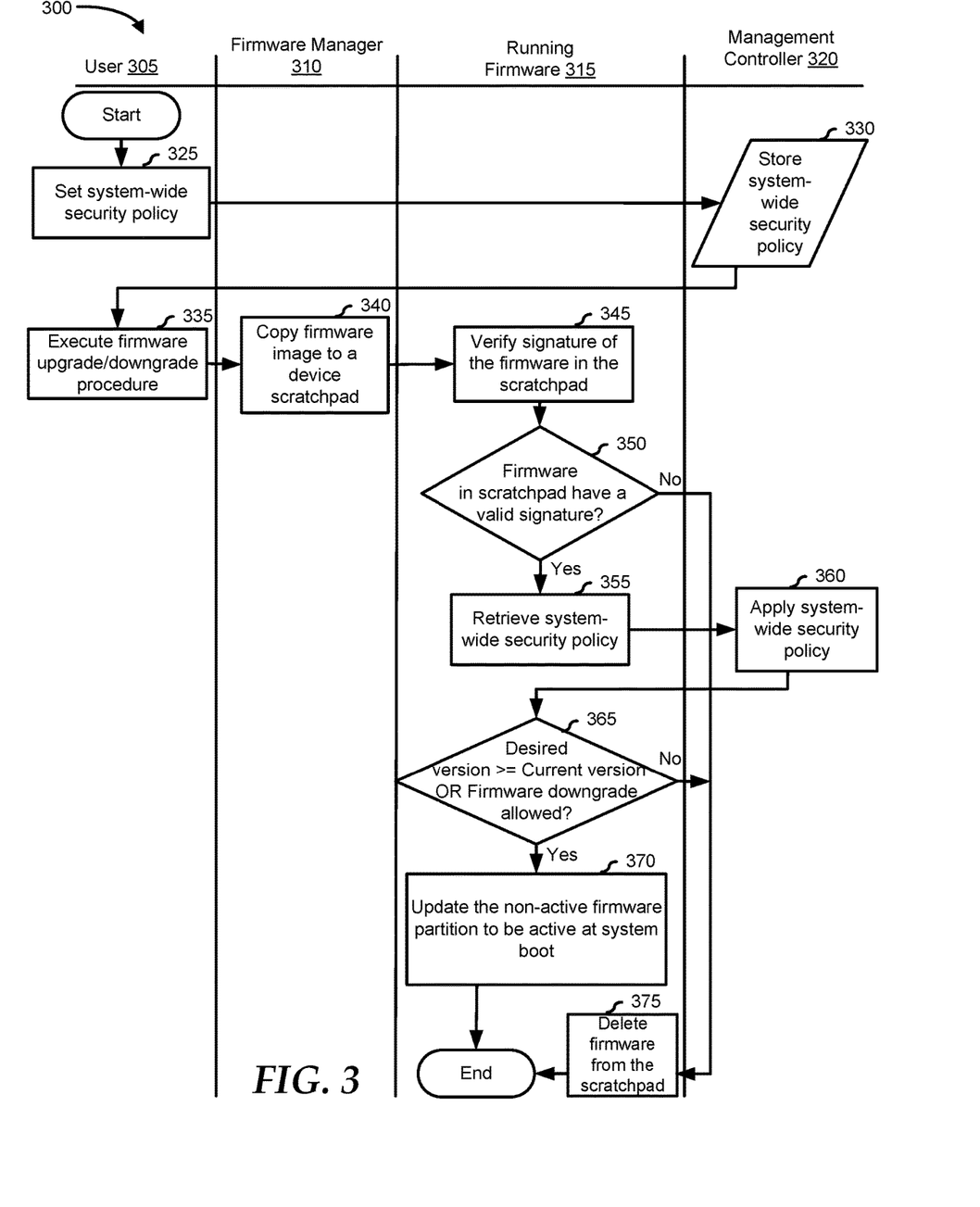
FIG. 3 is a flowchart illustrating an example of a method for system-wide firmware downgrade.

FIG. 3 shows a method 300 for system-wide firmware management including firmware update and/or downgrade. Method 300 may be used to securely enforce a security policy similar to security policy 270 of FIG. 2. Method 300 may enforce the security policy using a management channel of a management controller. The management channel may be a dedicated or an exclusive channel for the management of devices of the information handling system.

FIG. 3 also includes a user 305 who may be an IT professional, an administrator, or a program code. In addition, FIG. 3 also includes a running firmware 315, which may be the firmware currently installed and running on a device. FIG. 3 includes a firmware manager 310 which may be similar to firmware manager 225 of FIG. 2, and management controller 320 which may be similar to management controller 240. While embodiments of the present disclosure are described in terms of environment 200 of FIG. 2, it should be recognized that other systems may be utilized to perform the described method. User 305 may perform block 325 and block 335. Firmware manager 310 may perform block 340. Running firmware 315 may perform block 345, decision block 350, block 355, decision block 365, block 370, and block 375. Management controller 320 may perform block 330, and block 360.

Method 300 shows how a firmware upgrade or firmware downgrade may be modified to query a management controller for the security policy during the firmware uprade or the firmware downgrade. The firmware upgrade process typically begins with a user setting the firmware policy for an information handling system using the management controller. If the user subsequently decides to downgrade the firmware, then a firmware currently running at the device may query the management controller for the security policy. The user may decide to downgrade the device firmware to an older version of the device firmware for various reasons such as compatability. Method 300 typically starts at block 325.

At block 325, the method may set an attribute of the security policy. The attribute may include security settings that affect the downgrade of the firmware. For example, the attribute may be a flag that if set to true would then allow the downgrade of the firmware to an older version. If the attribute is set to false, then the downgrade of the firmware to an older version may not be allowed. The security policy may include one more laws, rules, and/or practices that regulate the firmware downgrade. With the security policy, the administrator can control the downgrade of the firmware of the device to a particular version. For example, the security policy may disallow a particular version, may allow a particular version greater than a specific version for a specific device, or allow certain firmware versions for the specific device. User 305 may set the security policy at management controller 320.

The method proceeds to block 330 where the method may store the security policy at a storage medium associated with management controller 320. The method proceeds to block 335 where the method executes the firmware upgrade or the firmware downgrade procedure. Prior to executing the firmware upgrade or the firmware downgrade procedure, a firmware image may have been downloaded. If the procedure is the firmware upgrade, then the firmware image may be a newer version of running firmware 315. If the procedure is the firmware downgrade, then the firmware image may be an older version of running firmware 315. In another embodiment, the firmware image may be the same version as running firmware 315. The firmware image may be a desired version to replace running firmware 315. The method proceeds to block 340.

At block 340, the method may copy the firmware image to a scratchpad. The scratchpad is a memory used for the temporary storage of calculations, data, and other work in progress. The scratchpad may be a non-active portion of an NV-RAM such as an EEPROM or a flash memory. The scratchpad may be associated with management controller 320 or the device whose firmware is being upgraded or downgraded. The method proceeds to block 345.

At block 345, the method verifies whether the firmware image in the scratchpad has a valid signature. The method verifies the signature to ensure the authenticity of the firmware image which may be performed using a hash of a public key that is embedded into the system's platform controller hub (PCH) by a manufacturer of the device. The method may verify the signature by comparing the hash of the public key with the signature of the firmware image. If they are the same, then the firmware image has a valid signature. Authenticating the firmware update is useful to ensure that the firmware update was issued by the manufacturer and not a malicious third party. However, authenticating the firmware update does not ensure that the firmware update is bug-free or otherwise compatible with an information handling system or network configuration. The method proceeds to decision block 350.

At decision block 350, the method may determine whether the firmware image in the scratchpad has a valid signature. If the firmware has a valid signature, then the "YES" branch is taken and the method proceeds to block 355. If the firmware image does not have a valid signature, then the "NO" branch is taken, and the method proceeds to block 375.

At block 355, the method may retrieve the security policy from the storage medium. The security policy may be the security policy that was set by user 305 at block 325. The system security policy may be associated with the information handling system. In another embodiment, the security policy may be associated with one or more firmware or devices. The method may retrieve the security policy using a management communication channel of management controller 320. The method proceeds to block 360.

At block 360, the method applies or enforces the retrieved security policy. Based on the security policy, the method determines whether to allow or disallow the firmware downgrade. In one embodiment, the security policy may allow or disallow the firmware downgrade based on the version of the firmware to be downgraded to. The security policy may allow the firmware to be downgraded to certain versions. The security policy may prevent the firmware to be downgraded from one version to another version with known security vulnerabilities based on the version. In another embodiment, the security policy may allow or disallow the firmware downgrade based on the release version instead of the firmware version. In yet another embodiment, the security policy may include a whitelist and/or a blacklist of firmware versions or firmware hashes for each device or component. The method proceeds to decision block 365.

At decision block 365, the method may determine whether a desired version of the firmware is greater than or equal to the current version of running firmware 315. The method may also determine whether the firmware downgrade is allowed. If the desired version is greater than or equal to the current version or if the firmware downgrade is allowed, then the "YES" branch is taken, and the method proceeds to block 370. The desired version may be the version of the firmware image in the scratchpad. The current version may be the version of running firmware 315. The method may determine whether the firmware downgrade is allowed or not allowed based on the attribute in the security policy. If the desired version is not greater than or equal to the current version or if the firmware downgrade is not allowed, then the "NO" branch is taken, and the method proceeds to block 375.

At block 370, the method may upgrade or downgrade the firmware based on the firmware image in the scratchpad. For example, if the desired version of the firmware is greater than or equal to the current version of running firmware 315, then the method may upgrade the firmware. Otherwise, the method determines if downgrade of the firmware is allowed. If the downgrade of running firmware 315 is allowed, then firmware downgrade may be performed.

In one embodiment, the firmware image in the scratchpad may be loaded in a non-active firmware partition. In another embodiment, the scratchpad may be the non-active firmware partition of the memory associated with the device. The method may also update the non-active firmware partition to make it active on the next system boot. The method may set a flag associated with the non-active partition to true. As such, the firmware in the non-active firmware partition will be the new running firmware of the device. In addition, the method may perform one or more functions in accordance with the security policy. The method ends.

At block 375, the method may delete the firmware image in the scratchpad and/or the non-active firmware partition. In addition, the method may perform one or more actions associated with the failed upgrade or downgrade of the firmware. For example, the method may do a system boot.

Figure 4:
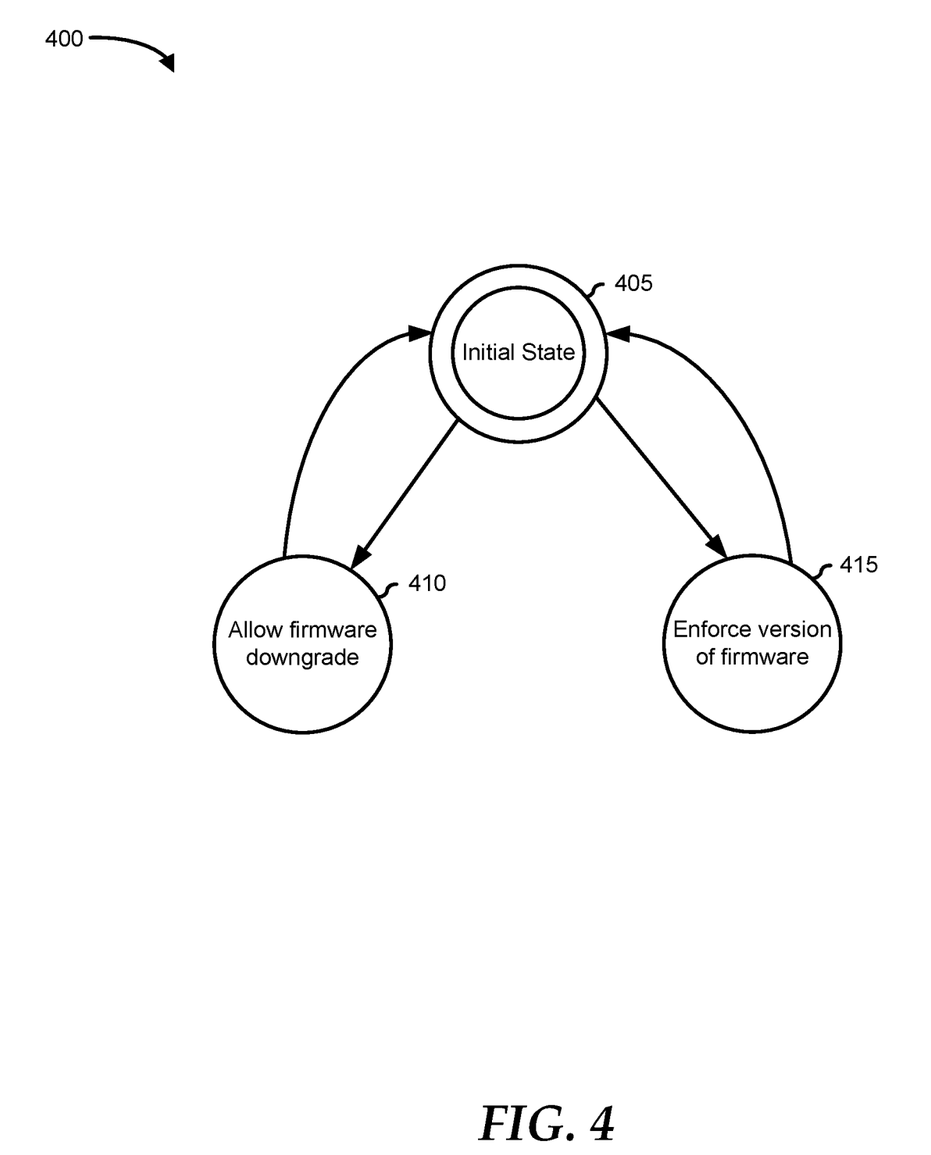
FIG. 4 is a flowchart illustrating an example of a process model for system-wide firmware downgrade.

FIG. 4 shows a process model 400 for system-wide firmware management including firmware upgrade and/or firmware downgrade. Process model 400 process states in the enforcement a security policy using set once clear on reset three-state adapter attribute set by the BIOS on system boot. Process model 400 may rely on the security of the BIOS and run before the information handling system boots to an operating system where an in-band firmware update may occur. While embodiments of the present disclosure are described in terms of environment 200 of FIG. 2, it should be recognized that other systems may be utilized to perform the described method.

State 405 is typically the initial state of process model 400. At this state, an attribute of the security policy may be in its "unset" state which the firmware may treat as "enforcing." The BIOS set the attribute of the security policy to "allowed" or "enforcing" on system boot. The attribute may be a three-state attribute instead of a two-state attribute. The states of the attribute may include, "unset," "allowed," and "enforcing." The "unset" state may be the initial state of the attribute. The "allowed" state of the attribute is set to allow downgrade of the firmware. The "enforcing" state of the attribute is set to disallow downgrade of the firmware, wherein the version is enforced. The three-state of the attributes allows the BIOS to change the setting of the attribute to the "allowed" state or to the "enforcing" state. In addition, in an instance wherein the BIOS cannot change the setting of the attribute, such as when the BIOS is an older version without the function to change the setting of the attribute, the firmware can set the attribute to "enforcing" when it detects it detects re-initialization corresponding to an operating system driver loading or a timeout occurs. The attribute is volatile but can not be changed once set without removing and reapplying the main power to the card through a system reset.

State 405 may transition to process state 410 when the attribute of the security policy is set to "allowed" which allows firmware downgrade to an older version. For example, a flag may be set to true to allow the firmware downgrade. The attribute may be set in the BIOS via a management interface such as Dell® Human Interface Infrastructure (HII) configuration utility. At process state 410, the downgrade of the firmware to an older version is allowed. Process state 410 may transition back to state 405 upon removing and re-applying power to the processor such as at a system reboot.

State 405 may transition to state 415 when the attribute of the security policy is set to "enforcing" which does not allow the firmware downgrade to an older version. For example, a flag may be set to false to not allow the firmware downgrade. The attribute may be set in the BIOS via the HII configuration utility. By setting the attribute to not allow the firmware downgrade, the version of the firmware is enforced by the security policy via the BIOS. The version may refer to the security version, the firmware version, or the release version of the firmware. The version of the firmware may also be enforced upon the re-initialization of the device driver or a device driver timeout. State 415 may transition back to state 405 upon removing and re-applying power to the processor such as at a system reboot.

Figure 5:
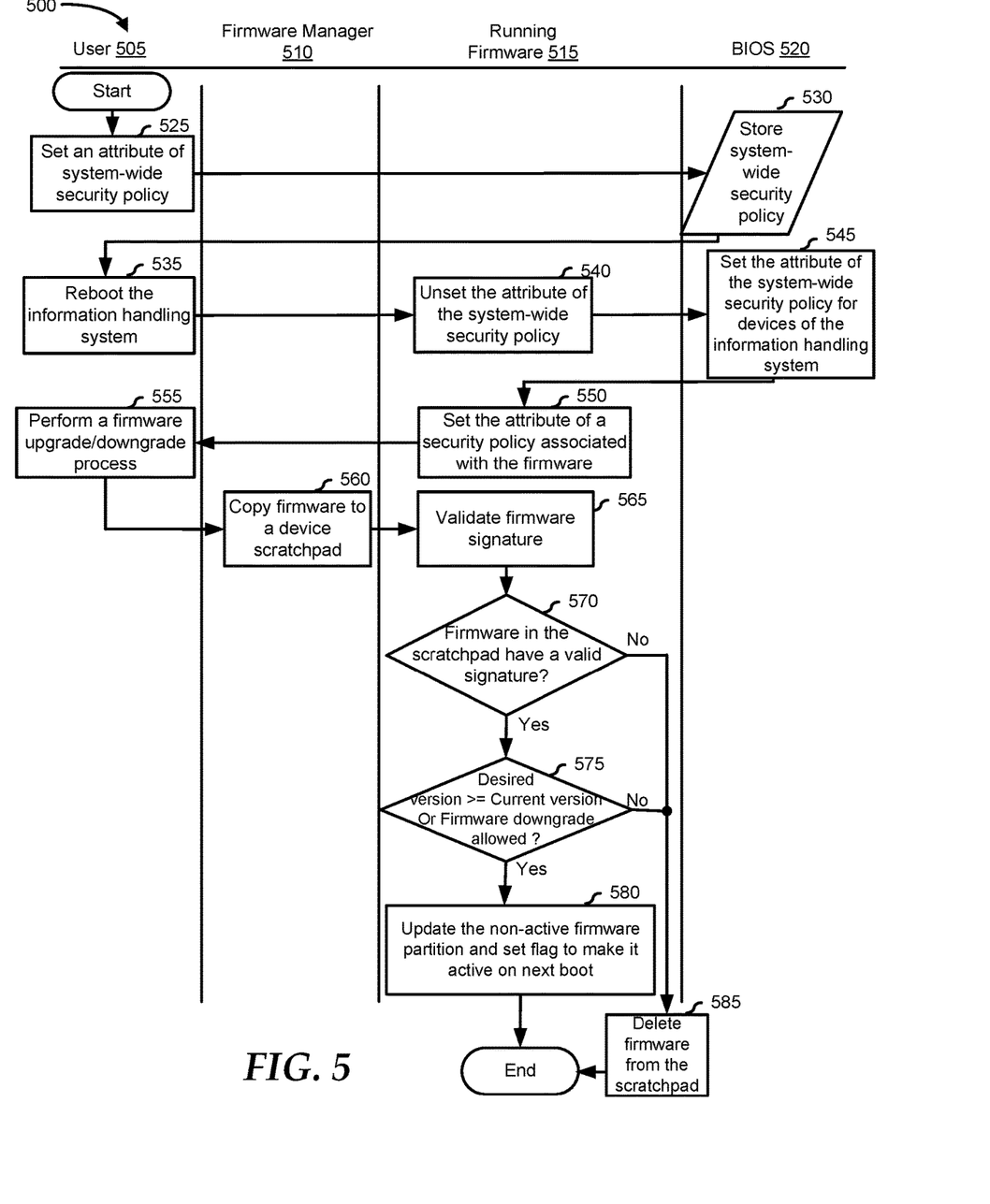
FIG. 5 is a flowchart illustrating an example of a method for system-wide firmware downgrade.

FIG. 5 shows a method 500 for system-wide firmware management including firmware upgrade and/or downgrade. Method 500 shows how a firmware update process is modified to utilize a security policy attribute. The firmware update process begins with the user setting the security policy attribute in the BIOS. When the information handling system boots, the BIOS will set the security policy attribute prior to booting to the operating system. If subsequently, the user attempts to downgrade the firmware, the running firmware will look at the security policy attribute to determine if the downgrade is allowed.

FIG. 5 includes a user 505, a firmware manager 510, a running firmware 515, and a BIOS 520. Firmware manager 510 may be similar to firmware manager 225 of FIG. 2. While embodiments of the present disclosure are described in terms of environment 200 of FIG. 2, it should be recognized that other systems may be utilized to perform the described method. User 505 may perform block 525, block 535, and block 555. Firmware manager 510 may perform block 560. Running firmware 515 may perform block 540, block 550, block 565, decision block 570, decision block 575, block 580, and block 585. BIOS 520 may perform block 530 and block 545. Method 500 typically starts at block 525.

At block 525, the method may set an attribute of the security policy. The attribute may be set to allow or disallow downgrade of the firmware. User 505 may set the system security downgrade policy at BIOS 520. After setting the attribute, the method may proceed to block 530 where the method may store or save the updated security policy at a storage medium which may be associated with BIOS 520. BIOS 520 may be similar to BIOS/EFI 142 of FIG. 1. The method proceeds to block 535 where the method may reboot the information handling system. After the reboot, the method may proceed to block 540 where the method may unset the attribute of the security policy associated with running firmware 515.

The method then proceeds to block 545 where the attribute of the security policy may be set for one or more devices of the information handling system. In particular, the attribute may be set for all the devices. The attribute may be similar to the attribute in block 525. The method may proceed to block 550 where it may set the attribute of the security policy associated with running firmware 515. The attribute may also be similar to the attribute in block 525. The method may proceed to block 555 where user 505 may initiate a firmware upgrade or firmware downgrade of running firmware 515. The method may proceed to block 560 where it may copy the firmware image to a scratchpad of the device associated with running firmware 515. Similar to block 340 of FIG. 3, with the firmware upgrade, the firmware image may be a newer version of running firmware 315. With the firmware downgrade, the firmware image may be an older version of running firmware 315.

The method may proceed to block 565 where it may validate the signature of the firmware image in the scratchpad. Subsequent to validating the signature, the method may proceed to decision block 570. At decision block 570, the method determines whether the signature of the firmware image in the scratchpad is valid. If the signature of the firmware in the scratchpad is valid, then the "YES" branch is taken and the method proceeds to decision block 575. If the signature of the firmware image in the scratchpad is not valid, then the "NO" branch is taken and the method proceeds to block 585.

At decision block 575, the method may determine whether a desired version of the firmware is greater than or equal to the current version. The version may refer to the security version, the firmware version, or the release version of running firmware 515. The method may also determine whether the firmware downgrade is allowed. If the desired version is greater than or equal to the current version or if the firmware downgrade is allowed, then the "YES" branch is taken, and the method proceeds to block 580. If the desired version is less than the current version or if the firmware downgrade is not allowed, then the "NO" branch is taken, and the method proceeds to block 585.

At block 580, the method may upgrade or downgrade the firmware based on the firmware image in the scratchpad. The upgraded or downgraded firmware may be loaded in a non-active firmware partition. In another embodiment, the scratchpad is the non-active firmware partition. The method may also update the non-active firmware partition to make it active on the next system boot. In addition, the method may perform one or more functions in accordance with the security policy. Afterwards, the method ends.

At block 585, the method may delete the firmware image in the scratchpad. In addition, the method may perform one or more actions associated with the failed upgrade or downgrade of the firmware. For example, the method may do a system boot. Afterwards, the method ends.

Figure 6:
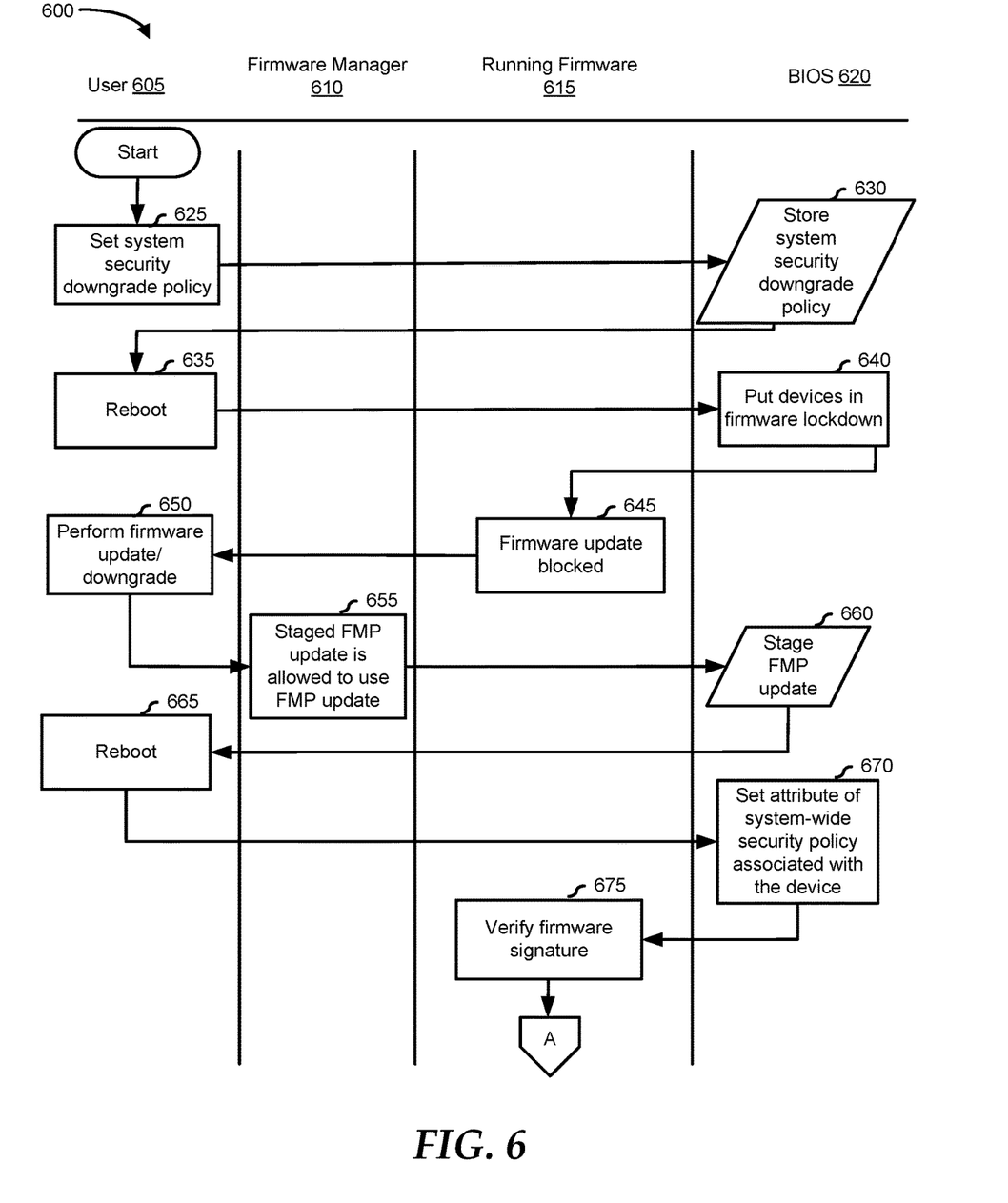
FIGS. 6 and 7 are flowcharts illustrating an example of a method for system-wide firmware downgrade.

FIG. 6 shows a method 600 for system-wide firmware management including firmware upgrade and/or downgrade. Method 600 may be used to securely enforce a security policy using the firmware lockdown function of an enhanced system lockdown, wherein an attribute of the security policy may be set by the BIOS before the unified extensible firmware interface (UEFI) firmware management protocol (FMP) update.

FIG. 6 includes a user 605, a firmware manager 610, a running firmware 615, and a BIOS 620. Firmware manager 610 may be similar to firmware manager 225 of FIG. 2. While embodiments of the present disclosure are described in terms of environment 200 of FIG. 2, it should be recognized that other systems may be utilized to perform the described method. User 605 may perform block 625, block 635, block 650, and block 665. Firmware manager 610 may perform block 655. Running firmware 615 may perform block 645 and block 675. BIOS 620 may perform block 630, block 640, block 660, and block 670. Method 600 typically starts at block 625.

At block 625, the method may set an attribute in the security policy in BIOS 620. The security policy may be associated with the information handling system. The method may proceed to block 630 where it stores the security policy in a storage medium associated with BIOS 620. The method may proceed to block 635 where the method performs a system boot. After the system boot, the method may proceed to block 640.

At block 640, the method may put adapters of the devices of the information handling system in firmware lockdown before booting the information handling system to the operating system. For example, a flag may be set to true to put the adapters in firmware lockdown. The firmware lockdown protects the information handling system from configuration or firmware changes. The method may then proceed to block 645 where the firmware update is blocked. By enabling the firmware lockdown, in-band firmware updates may be blocked. The firmware manager 610 may be modified to perform firmware updates as stage UEFI FMP updates instead of in-band firmware update. The method may proceed to block 650 where the method may perform a firmware update and/or downgrade. The method may then proceed to block 655.

At block 655, the method allows a staged UEFI FMP update is allowed to use FMP updates. The UEFI FMP provides firmware management support to one or more devices of the information handling system. The firmware management support includes updating the firmware of the one or more devices. Updating the firmware includes identifying the firmware image and programming the firmware image in the device. The method may also disallow other firmware updates to use UEFI FMP updates. The method may proceed to block 660 where the UEFI FMP update is staged. Similar to block 340 of FIG. 3, with the firmware upgrade, the firmware image that is staged may be a newer version of running firmware 615. With the firmware downgrade, the firmware image that is staged maybe an older version of running firmware 615. The method may then proceed to block 665 where the method performs a system boot.

After the system boot, the method may proceed to block 670 where the method sets the attribute of the security policy. In particular, the security policy may be associated with the adapter of the device. In addition, setting the attribute may be performed prior to executing the staged firmware by BIOS 620. Alternatively, BIOS 620 could be programmed with a whitelist of firmware hashes that would allow UEFI FMP firmware updates. This way, BIOS 620 may be the enforcer of the security policy instead of leveraging the firmware of the device. The method may proceed to block 675 where the method verifies the signature of the firmware and proceeds to decision block 710 of FIG. 7.

Figure 7:
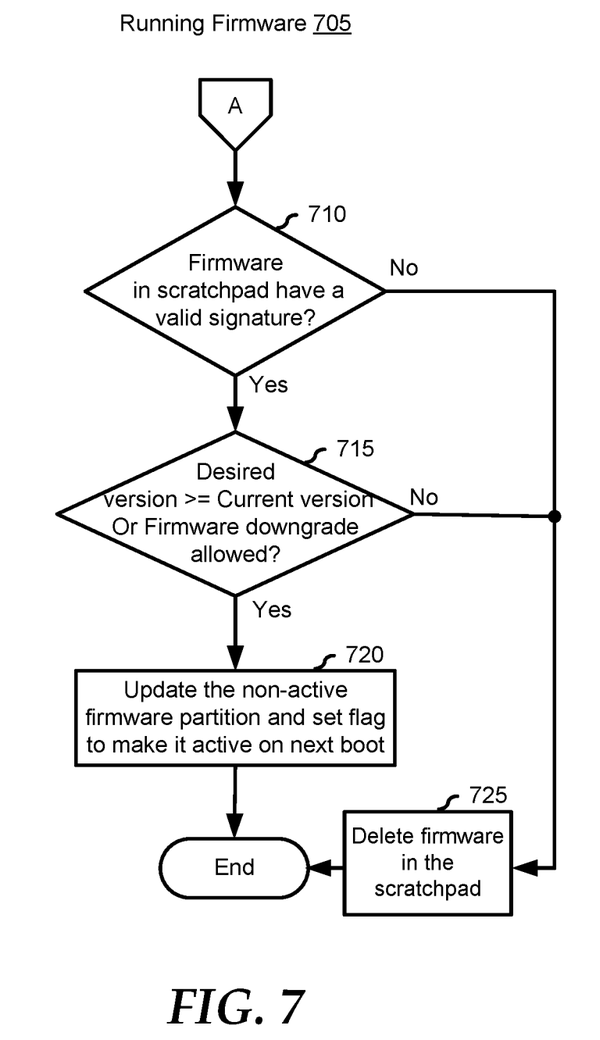

FIG. 7 shows a method 700 which is a continuation of method 600 of FIG. 6. Method 700 is performed by running firmware 705 which is similar to running firmware 615 of FIG. 6. Method 700 typically starts at decision block 710 where the method determines whether the firmware signature is valid. If the firmware signature is valid, then the "YES" branch is taken and the method proceeds to decision block 715. If the firmware signature is not valid then the method proceeds to block 725.

At decision block 715, the method may determine whether the desired version is greater than or equal to the current version. If the desired version is greater than or equal to the current version or if the firmware downgrade is allowed, then the "YES" branch is taken, and the method proceeds to block 720. If the desired version is less than the current version or if the firmware downgrade is not allowed, then the "NO" branch is taken, and the method proceeds to block 725. The method may also determine whether the firmware downgrade is allowed based on a check by the security policy. If the security policy check passes then the firmware downgrade is allowed, otherwise, the firmware image is deleted from the scratchpad.

At block 720, the method may upgrade or downgrade the firmware based on the firmware image in the scratchpad. The upgraded or downgraded firmware may be loaded in a non-active firmware partition. The method may also update the non-active firmware partition to make it active on the next system boot. In addition, the method may perform one or more functions in accordance with the security policy. The method ends. At block 725, the firmware on the scratchpad is discarded on the firmware update fails. Then the method ends.

Although FIG. 3, FIG. 5, FIG. 6, and FIG. 7 show example blocks of method 300, method 500, method 600, and method 700 respectively in some implementation, the aforementioned methods may include additional blocks, fewer blocks, different blocks, or differently arranged blocks than those depicted in the figures. Additionally, or alternatively, two or more of the blocks of the methods may be performed in parallel. For example, block 340 and block 345 of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method of altering firmware in an information handling system, the method comprising:
    updating the firmware, wherein the information handling system is associated with a system-wide firmware downgrade security policy, and wherein the system-wide firmware downgrade security policy is stored in a storage device associated with a baseboard management controller of the information handling system;
    modifying an attribute of the system-wide firmware downgrade security policy during the updating of the firmware, wherein the attribute of the system-wide firmware downgrade security policy is associated with allowing or disallowing downgrading of a release version of the firmware; and
    downgrading the firmware, including:
        storing a firmware image to a scratchpad, wherein the scratchpad is a non-active firmware partition, and wherein the firmware image is an older release version of the firmware;
        querying the baseboard management controller for the system-wide firmware downgrade security policy in the storage device via a management communication channel;
        if the downgrading of the firmware is allowed based on the attribute of the system-wide firmware downgrade security policy, then updating the non-active firmware partition to be active on boot of the information handling system; and
        if the firmware image has a security vulnerability, then providing an override to allow a user to proceed with the downgrade of the firmware.

2. The method of claim 1, further comprising if a first version is greater than or equal to a second version, then upgrading the firmware, wherein the first version is of the firmware image in the scratchpad.

3. The method of claim 2, wherein the second version is of the firmware.

4. The method of claim 1, further comprising determining whether the firmware image in the scratchpad has a valid signature.

5. The method of claim 1, wherein the system-wide firmware downgrade security policy includes a white list of allowed versions.

6. The method of claim 1, wherein the system-wide firmware downgrade security policy includes a black list of disallowed versions.

7. The method of claim 1, wherein the system-wide firmware downgrade security policy includes a list of firmware hashes.

8. The method of claim 1, if the downgrading of the firmware is disallowed, then removing the firmware from the scratchpad.

9. An information handling system, comprising:
    a basic input/output system configured to update an attribute of a system-wide firmware downgrade security policy prior to booting to an operating system of the information handling system and put devices of the information handling system in firmware lockdown, wherein the attribute of the system-wide firmware downgrade security policy is used to determine whether to allow or to disallow downgrade of a firmware to a version, and wherein the firmware lockdown blocks in-band firmware updates; and
    a processor configured to:
        perform the downgrade of the firmware, wherein the downgrade of the firmware includes the processor further configured to check the attribute of the system-wide firmware downgrade security policy and to store a firmware image in a scratchpad;
        if the attribute of the system-wide firmware downgrade security policy allows the downgrade of the firmware to the version, then continue with the downgrade of the firmware; and
        if the firmware image has a security vulnerability, then providing an override to allow a user to proceed with the downgrade of the firmware.

10. The information handling system of claim 9, wherein the downgrade of the firmware includes the processor further configured to determine whether a desired version of the firmware is greater than or equal to a current version of the firmware.

11. The information handling system of claim 9, wherein if the downgrade of the firmware is not allowed, then removing the firmware image from the scratchpad.

12. The information handling system of claim 9, wherein the processor is further configured to load the firmware image from the scratchpad to a non-active firmware partition.

13. The information handling system of claim 12, wherein the processor is further configured to update a flag of the non-active firmware partition such that the non-active firmware partition becomes active on system boot.

14. A method of enforcing a system-wide firmware downgrade security policy, the method comprising:

updating an attribute in the system-wide firmware downgrade security policy, wherein the attribute is associated with whether to allow to disallow a downgrade of a firmware;

enabling, by a basic input/output system, a firmware lockdown of a device of an information handling system during a system boot prior to booting to an operating system, wherein the firmware lockdown of the device allows a unified extensible interface staged firmware management protocol process, wherein the firmware lockdown blocks an in-band firmware update;

downgrading the firmware of the device wherein the downgrading is based on the attribute of the system-wide firmware downgrade security policy;

if the downgrade of the firmware is allowed, then continuing with the downgrading of the firmware via the staged unified extensible interface firmware management protocol process instead of the in-band firmware update; and if a firmware image has a security vulnerability, then providing an override to allow a user to proceed with the downgrade of the firmware.

15. The method of claim 14, wherein the attribute may be set for more than one device.

16. The method of claim 14, wherein the system-wide firmware downgrade security policy includes a whitelist of firmware hashes.

17. The method of claim 14, wherein the system-wide firmware downgrade security policy includes a blacklist of firmware hashes.

18. The method of claim 14, wherein the enabling of the firmware lockdown is subsequent to updating a first attribute of the system-wide firmware downgrade security policy.

19. The method of claim 14, further comprising copying the firmware image to a scratchpad.

20. The method of claim 19, further comprising if the downgrade of the firmware is not allowed, then deleting the firmware image from the scratchpad.

\* \* \* \* \*